United States Patent [19]

FitzGerald

[11] 4,413,305
[45] Nov. 1, 1983

[54] TERMINAL FOR A CAPACITOR AND A METHOD OF FORMING SAME

[75] Inventor: Cecil W. FitzGerald, Sidney, N.Y.

[73] Assignee: The Bendix Corporation, Southfield, Mich.

[21] Appl. No.: 390,165

[22] Filed: Jun. 21, 1982

[51] Int. Cl.³ .......................... H01G 1/14; H01R 3/00
[52] U.S. Cl. .................................. 361/306; 339/278 R
[58] Field of Search ..................... 361/306, 307, 308; 339/220, 278

[56] References Cited

U.S. PATENT DOCUMENTS

| | | | |
|---|---|---|---|
| 1,248,829 | 12/1917 | Dick | 361/308 X |
| 1,796,683 | 3/1931 | Carlson | 361/307 X |
| 1,833,392 | 11/1931 | Dubilier | 361/306 |
| 1,862,297 | 6/1932 | Butler | 361/307 |
| 1,900,352 | 3/1933 | Lewis | 361/308 |
| 2,004,616 | 6/1935 | Park | 361/308 |
| 2,049,585 | 8/1936 | Gunthorp | 339/278 R X |
| 2,908,886 | 10/1959 | Frekko | 339/220 C |
| 3,267,343 | 8/1966 | Rayburn | 361/308 |

FOREIGN PATENT DOCUMENTS

| | | | |
|---|---|---|---|
| 868480 | 2/1953 | Fed. Rep. of Germany | 361/306 |
| 713058 | 8/1954 | United Kingdom | 361/306 |

*Primary Examiner*—Donald A. Griffin
*Attorney, Agent, or Firm*—Raymond J. Eifler

[57] ABSTRACT

A terminal (2) for a capacitor (1) is formed by making a first fold A (90 degrees) in a metal strip; making a second fold B (180 degrees) in the strip; and making a third fold C (45 degrees) in the strip at an oblique angle to a lateral edge of the strip so that one end of the terminal (2) is laterally spaced from an edge of said strip.

8 Claims, 4 Drawing Figures

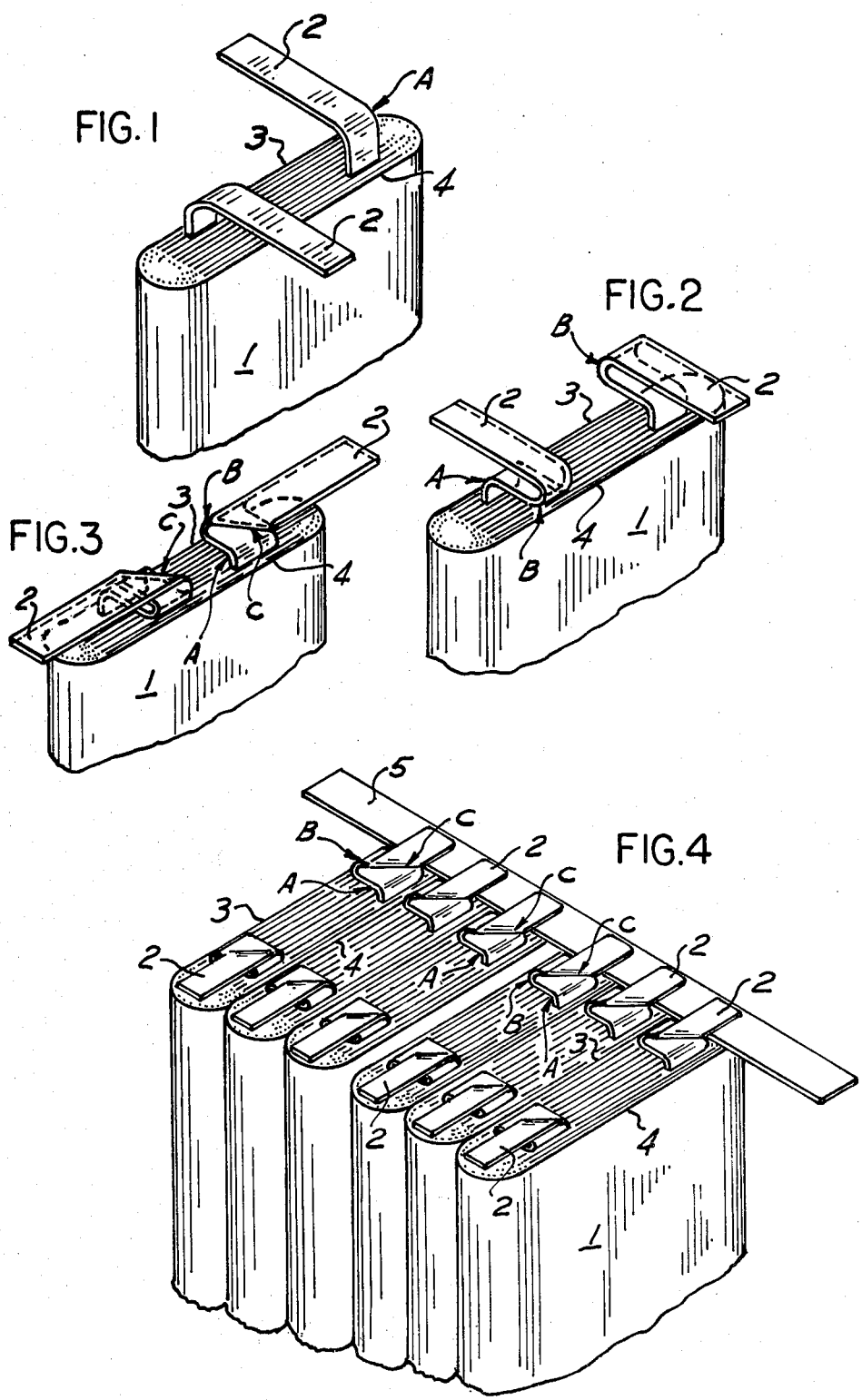

TERMINAL FOR A CAPACITOR AND A METHOD OF FORMING SAME

This invention relates to capacitors and more particularly to the terminal which extends from one end of the capacitor.

Some capacitors are manufactured from a metal foil and a dielectric material wound in a circular or rectangular shape to form a capacitor of a given capacitance. Such a capacitor may be found in U.S. Pat. No. 1,900,352 issued July 13, 1929 and entitled "Condenser and Method of Making Same". The conducting foil used in such capacitors is usually extremely thin and fragile and a metal strip of electrically conductive material is generally attached to each end of the foil as terminals which may then be connected into an electrical circuit.

When an electrical conductor is connected to the terminal members it is customary to solder such terminals to the conductor. If the conductor moves it also moves one end of the terminal which may move the other end of the terminal and cause the terminal to tear away from the foil to which it was attached. One example of a capacitor terminal may be found in U.S. Pat. No. 1,248,829 issued Dec. 4, 1917 and entitled "Condenser Terminal and Method of Forming Same".

DISCLOSURE OF THE INVENTION

This invention provides a terminal, one end of which will not tear away from the foil to which it is attached when the other end is moved a small distance. It also allows a conductor to be soldered to the terminal without allowing the solder to flow into the folds which would prevent the folds from allowing movement of a portion of the terminal.

Accordingly, it is an advantage of this invention to provide a terminal, one end of which may be moved a small distance in a direction parallel or perpendicular to the central axis of a capacitor without causing strain on or movement of the other end of the terminal.

Another advantage of the invention is that it allows visual inspection of the solder joints between the tabs of several capacitors and a conductor that connects the tabs together.

DETAILED DESCRIPTION OF THE INVENTION

FIGS. 1, 2 and 3 illustrate how the capacitor tab is folded.

FIG. 4 illustrates the capacitor tabs soldered to a conductor.

Referring now to the drawings, FIG. 1 illustrates a capacitor 1 of the type comprised of a plurality of layers of foil and insulation wound to form a capacitor having terminals 2 that project beyond a lateral edge of the foil and insulation. The terminal 2 has a fold A, which is a 90 degree bend so that the terminal 2 extends in a direction past one edge 3 of the capacitor 1.

FIG. 2 illustrates a second fold B, which is a 180 degree bend, so that the terminal 2 extends in a direction past another edge 4 of said capacitor 1.

FIG. 3 illustrates a third fold C which is at an oblique angle (preferably 45 degrees) to a lateral edge of the terminal 2.

FIGS. 1, 2 and 3 illustrate a method of forming a terminal 2 from one end of an electrically conductive strip connected to the foil of a capacitor 1. The method includes making a first fold A (90 degrees) in the terminal 2 in a direction of one of the edges 3 of the capacitor; making a second fold B (180 degrees) in the terminal 2 in a direction of another portion of the edges 4 of the capacitor; and making a third fold C (45 degrees) in the terminal at an oblique angle to the lateral edges of the strip so that one end of the terminal 2 is laterally spaced from said folds.

FIG. 4 illustrates how an electrical conductor 5 is attached to one end of each of the terminals 2 along one side of the capacitors 1. Another metal conductor may be attached to the ends of the other terminals 2. Because of the oblique fold C in the terminals 2 the end of each terminal 2 may be soldered to the conductor 5 at a position that is not above the folds A or B. This prevents solder from flowing down onto the folds which would prevent the folds A or B from expanding when the conductor 5 is moved a small distance. The folds A and B in each terminal permit some movement of the end of the terminal 2 before placing a strain on the connection between the other end of the terminal 2 and the thin foil of the capacitor 1.

While a preferred embodiment of this invention has been disclosed, it will be apparent to those skilled in the art, that changes may be made to the invention as set forth in the appended claims, and in some instances, certain features of the invention may be used to advantage without corresponding use of other features. For instance there may be more than two folds in the terminal 2 to provide strain relief so long as there is also a fold at an oblique angle to the lateral edge of the strip forming the terminal. Accordingly, it is intended that the illustrative and descriptive materials herein be used to illustrate the principles of the invention and not to limit the scope thereof.

Having described the invention what is claimed is:

1. In combination with a capacitor of the type having a plurality of layers of foil and insulation wound to form a capacitor and at least one electrically conductive strip projecting beyond an edge of the layers of foil to provide a connecting terminal to an electrical conductor, the improvement wherein said terminal further comprises;

a first fold in said strip in the direction of one of said outside surfaces of said capacitor;

a second fold in said strip in a direction toward another portion of the outside surface of said capacitor; and a third fold at an oblique angle to an edge of said strip.

2. The combination as recited in claim 1 wherein the second fold is in the direction opposite of that of said first fold.

3. The combination as recited in claim 1 or 2 wherein one end of the strip extends beyond the lateral edges of said first and second folds.

4. The combination as recited in claim 1 wherein the first fold is a 90 degree bend, the second fold is a 180 degree bend and the third fold is a 45 degree bend.

5. A method of forming a terminal from one end of an electrically conductive strip connected to a foil capacitor comprising the steps:

folding the strip in a direction of one of the surfaces of said capacitor;

folding the strip in a direction of another portion of the outside surface of said capacitor; and folding the strip at an oblique angle to an edge of said strip so that one end of said strip is spaced from said folds.

6. The method as recited in claim 5 wherein the first fold is a 90 degree bend, the second fold is a 180 degree bend and the third fold is a 45 degree bend.

7. A method of forming a terminal from one end of an electrically conductive strip connected to a foil capacitor comprising the steps:

making a plurality of folds in the strip in opposite directions of each other; and making an additional fold in a strip at an oblique angle to a lateral edge of said strip so that one end of said terminal is spaced from said folds.

8. The method as recited in claim 5 or 7 including the step of:

soldering a conductor to the under side of the end of said strip.

* * * * *